Oct. 20, 1953    H. G. SOAR    2,656,068
DISPENSING HOSE NOZZLE WITH METERING DEVICE
Filed June 28, 1949    4 Sheets-Sheet 1
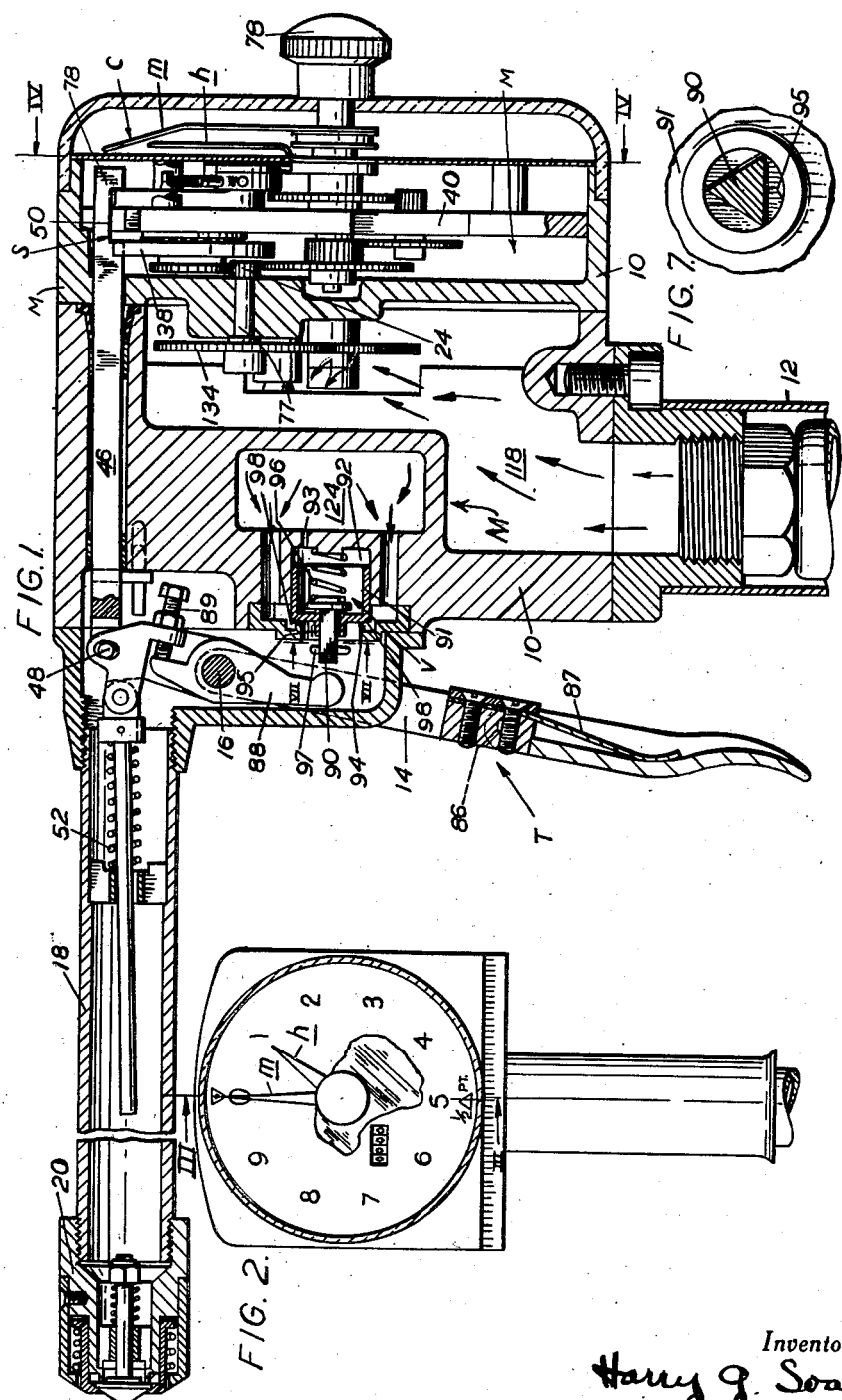
Inventor
Harry G. Soar
By Dowell & Dowell
Attorneys

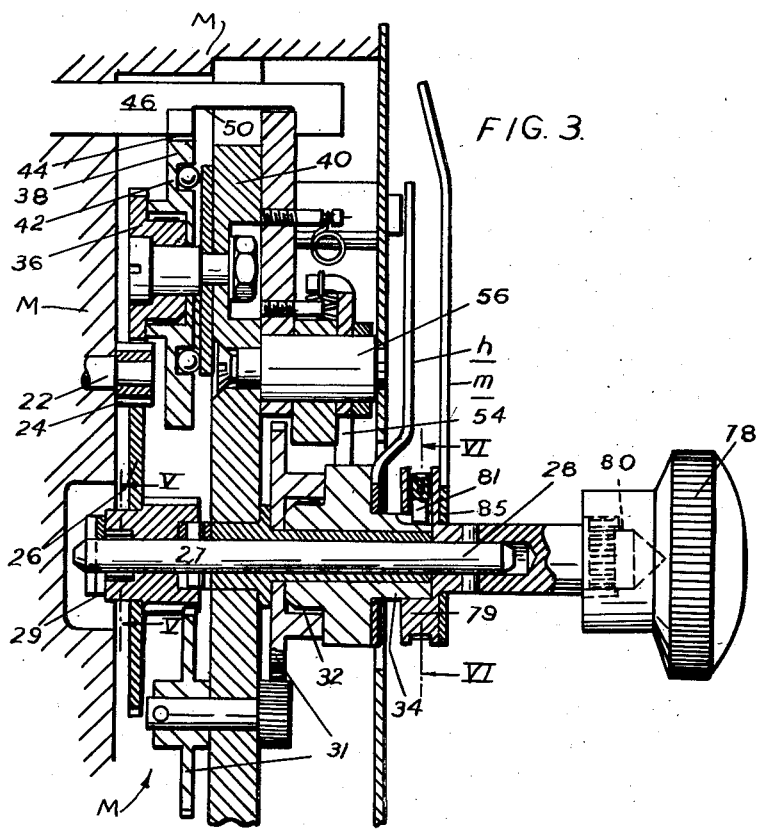
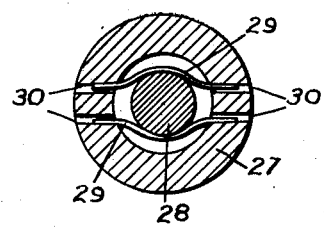
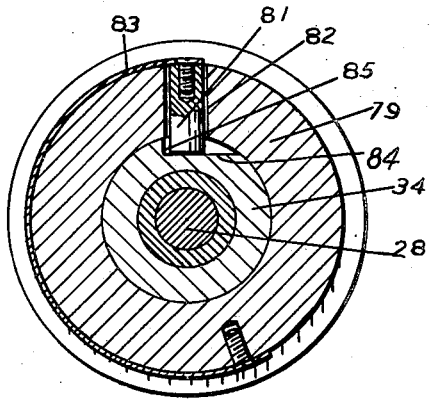

Inventor
Harry G. Soar
By Dowell и Dowell
Attorneys

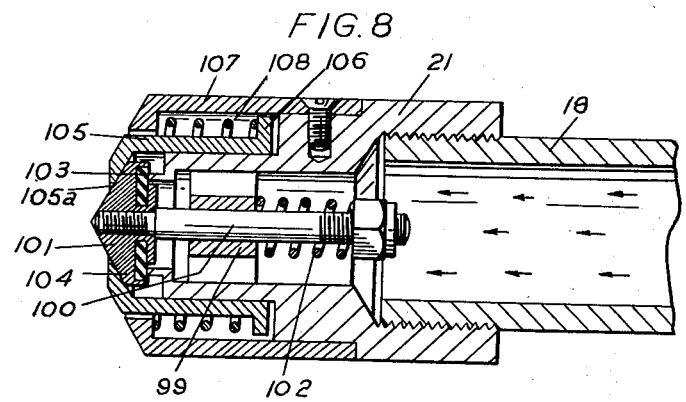
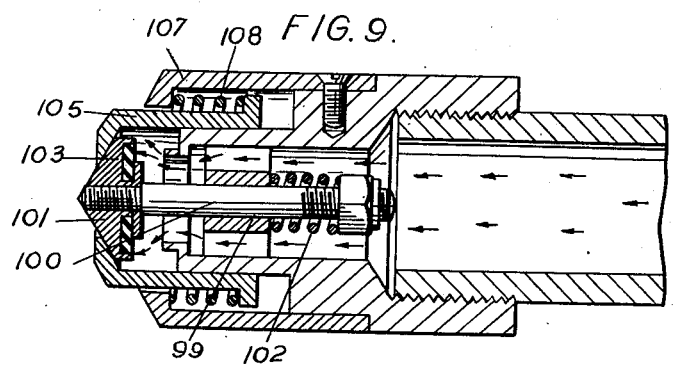
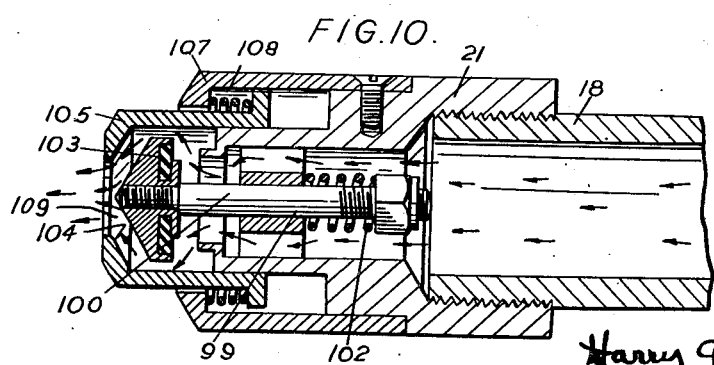

Patented Oct. 20, 1953

2,656,068

UNITED STATES PATENT OFFICE 2,656,068

DISPENSING HOSE NOZZLE WITH METERING DEVICE

Harry Godfrey Soar, Streatham Vale, London, England, assignor to Beck & Co. (Meters) Limited, London, England Application June 28, 1949, Serial No. 101,738
In Great Britain August 9, 1948

3 Claims. (Cl. 222—22)

This invention relates to liquid dispensing apparatus of a kind suitable for the supply of measured quantities of gasoline, lubricating oil or the like to purchasers, and its principal object is to provide an improved dispensing unit or nozzle of a generally simplified form or construction which will increase the handiness, accuracy and reliability of said type of device.

The invention consists of a portable delivery unit which can be attached to the delivery end of a hose and thereby be connected to a static source of supply such as the commonly used gasoline pump. This portable unit comprises a meter for the liquid to be dispensed, a volumetric delivery indicator operated by the meter, manually operable means for initiating delivery and means for automatically stopping the delivery when a predetermined quantity of liquid has been delivered.

As the unit is portable in the sense that it is intended to be carried by the station attendant who is to operate it, it must be of light weight. The use of a meter of the reciprocating and rotary piston type is advantageous in this respect. However, the actual design of the meter does not form part of this invention. Full details of such meters are to be found in applications Nos. 96,369, filed May 31, 1949, now Patent No. 2,622,566, and 101,781, filed June 28, 1949 (now U. S. Letters Patent No. 2,618,245, issued November 18, 1952).

In the preferred form of the invention, the automatic delivery stopping means included in this embodiment are the only means provided by which the delivery can be stopped, and said means are such or so designed that the delivery can be stopped only upon completion of delivery of a whole number of units of volume for which the indicator is calibrated. On the other hand, the automatic stopping can be initiated predeterminedly by the operator and, indeed, may be initiated at any time during the delivery of the last complete unit which it is desired to deliver. Thus, if a customer requires, say, 3 pints of oil and the indicator is calibrated in half-pint units, the operator can pre-determine or initiate "stop" action at any time during the delivery of the sixth half-pint, so that the delivery will stop automatically when the delivery of that sixth half-pint has been completed. Furthermore, the operator can, at any time after the automatic stopping has been initiated and before the delivery has actually stopped, make the automatic stopping ineffective so as to enable a larger quantity to be delivered than that which was originally contemplated.

An annoying feature of most devices for dispensing viscous liquids, such as lubricating oil, is that the liquid continues to drip from the delivery nozzle for a considerable time after flow has been cut off. This leads to waste and to objectionable puddle formations or soiling of the site where the nozzle is placed when not in use. The invention therefore provides, in connection with the portable unit defined above, a delivery valve or nozzle which prevents such objectionable dripping. It achieves this desirable result because it eliminates employment of any external recess or pocket in which liquid can collect and because it reduces to a minimum the external surface of the valve which is wetted during delivery of the liquid.

In the preferred form of the invention also, the delivery valve is operated by the supply pressure and has two seatings. A part of the valve is arranged so that it can be moved off one of the seatings by the operator, whereupon the supply pressure is allowed to act on and to move another part of the valve off the other seating and thus effectively open the valve.

In order that the invention may be properly understood and readily adapted to use an illustrative example of a delivery unit constructed in accordance therewith will now be described with reference to the accompanying drawings.

In said drawings:

Fig. 1 is a sectional elevation of the unit;

Fig. 2 is a back end elevation on a smaller scale than Fig. 1;

Fig. 3 is a section taken on the line III—III of Fig. 2;

Fig. 5 is a section taken on the line V—V of Fig. 3;

Fig. 6 is a section taken on the line VI—VI of Fig. 3;

Fig. 7 is a section taken on the line VII—VII of Fig. 1; and

Figs. 8 to 10 are enlarged sectional views of the delivery valve or nozzle shown in Fig. 1.

Figure 4:
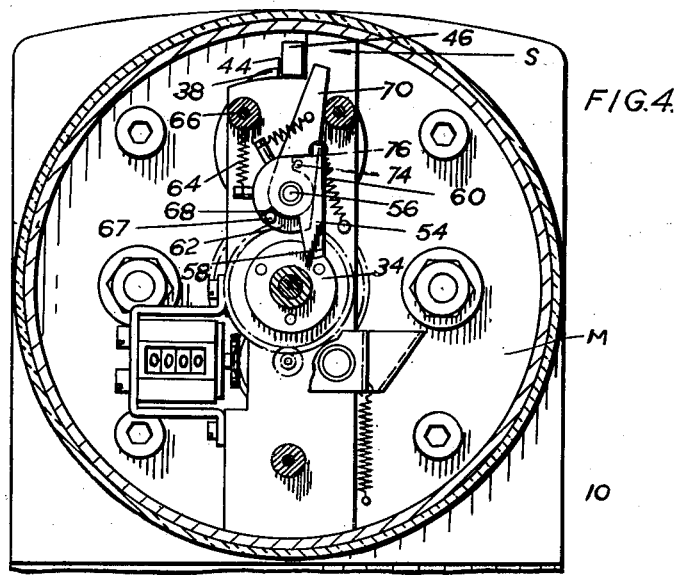
Fig. 4 is a section taken on the line IV—IV of Fig. 1.

The unit illustrated by the drawings comprises, as essential elements, a casing 10 attached to the delivery end of a hose 12, a meter M contained within said casing, a volumetric delivery indicator or "clock" C associated with and operated by the meter, a manually operated trigger mechanism T attached to the casing for initiating delivery through a connected discharge member and means S for automatically stopping the delivery when a pre-determined quantity of liquid has been delivered through said discharge member.

The meter M can be assumed to be similar in general to one of those applications Nos. 96,369, filed May 31, 1949, now Patent No. 2,622,566, and 101,781, filed June 28, 1949 (now U. S. Letters Patent No. 2,618,245, issued November 18, 1952). Provided in this instance within the casing 10 as aforesaid, it has a supply passage 118 which is in communication with the source of supply through the hose 12; and a delivery passage 124 which leads to a valve V. A trigger 14 pivotally mounted at 16 is arranged so that when it is moved towards the casing 10, it opens the valve V, thereby establishing communication through the meter between the source of supply and a delivery pipe 18 which extends from the casing. A pressure-operated valve or nozzle 20 at the end of the delivery pipe is opened and held open during flow by the pressure of the liquid delivered past the meter.

The "clock" C is driven by the meter. It has two hands—an "hour" hand $h$ and a "minute" hand $m$—which moves over a dial calibrated in units of the desired magnitude. The arrangement shown here was designed for dispensing lubricating oil to motorists. The selected standard unit of delivery is a half-pint. Hence the dial is calibrated in pints and half-pints with ten full unit markings, i. e. from zero to ten. The minute hand $m$ moves full-circle over the dial for one full unit measure, while the hour hand $h$ moves from one pint calibration mark to the next with each full unit measure dispensed.

Both of said hands are driven by the meter. The liquid driven pinion or turbine wheel 134 (Fig. 1) of the meter drives a shaft 22 carrying a pinion 24 which meshes with a wheel 26 (Fig. 3), on the hub 27 of which the minute hand arbor shaft 28 is connected through a strong friction clutch consisting of two springs 29 (Fig. 5), housed in slots 30 in the hub and bearing on said arbor shaft. The hub 27 is splined and is connected through reduction gearing 31 and a friction clutch 32 (of the kind 29 just described) to a sleeve 34 which carries the hour hand, also on the arbor shaft 28. A bushing (not reference numbered) on the shaft serves to assist this interconnection relationship between the parts.

The pinion 24 also drives, through a wheel 36 (Fig. 3), a disc 38 between which and the fixed chassis 40 is arranged a thrust bearing 42. The disc 38 has a notch 44 in its periphery in which, when the delivery unit is not in use, lies a rod 46 connected at 48 (Fig. 1) to the trigger 14.

When the trigger 14 is operated to open the valve V and start delivery of the liquid as previously stated, the rod 46 is pulled to the left so as to bring a notch 50 therein opposite or over the disc 38. This disengages said disc 38, which is then free to be turned by the meter. It is geared so that its notch 44 passes under the rod 46 or the notch 50 therein on completion of the delivery of each half-pint. If, at any time during the liquid delivery, the trigger 14 is released, it tends to resume its unoperated position (Fig. 1) under the action of a spring 52, but is unable to do so unless and until the notch 44 in the disc 38 has been brought opposite or in plane with the rod 46. In other words, the left hand end (Fig. 1) of the notch 50 in the rod 46 is held pressed against the face of the disc 38 and the valve V is accordingly maintained open by the trigger so that delivery persists until completion of the delivery of the next standard unit of volume. Thereupon, the notch 44 allows the spring 52 to move the rod 46 fully to the right so as to shut off the delivery flow.

It is essential now that it will not be possible to initiate a new delivery by means of the trigger until the hands of the clock have been re-set to zero. For this purpose, the parts shown particularly in Figs. 4 and 4A–4C are provided.

These parts include a lever 54 freely mounted on a pin 56 on the chassis 40 (Figs. 1 and 3), the outer end of which lever 54 engages in a notch 58 formed in the sleeve 34 when the hour hand $h$ is at zero. A spring 60 holds the lever 54 pressed against the periphery of the sleeve 34. The pin 56 also carries freely a piece 62 which is urged to turn clockwise by a spring 64 anchored to the chassis at 66. A pin 67 on the piece 62 abuts against a shoulder 68 on the lever 54 so that the spring 64 also holds the lever 54 pressed against the sleeve 34. A lever 70 is also freely mounted on the pin 56 and is urged to turn counter-clockwise by a spring 72 connected between it and the piece 62. The lever 70 has on its front face a pin 74 against which a shoulder 76 on the piece 62 can abut.

Figs. 1 and 4 show the parts in the positions they assume when the hands of the clock "C" are at zero and the unit is therefore ready for use. The rod 46 lies within the notch 44 so that the disc 38 cannot turn, and it is free to be moved to the left (Fig. 1) by the trigger 14 to free the disc 38.

Figure 4A:
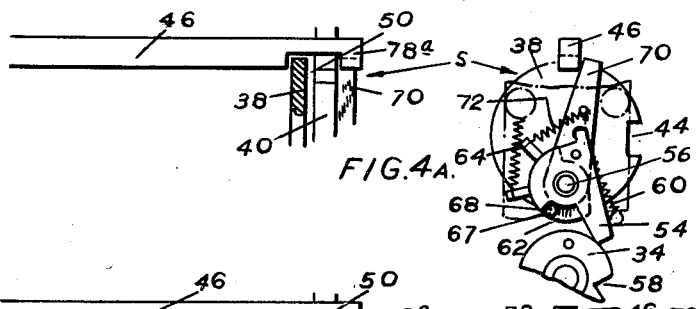
Figs. 4A, 4B and 4C are views of parts of Figs. 1 and 3, showing the different positions they take up at various times.

Fig. 4A shows the position of parts during delivery when the trigger 14 is held depressed. The rod 46 is held clear of the disc 38. The lever 70 is pressed against the end 78a of the rod 46 beyond the notch 50 because the rotation of the sleeve 34 which carries the hour hand has caused the lever 54 to be disengaged from the notch 58 and to ride on the cylindrical surface of the sleeve 34. The spring 72 is thus tensioned.

Figure 4B:
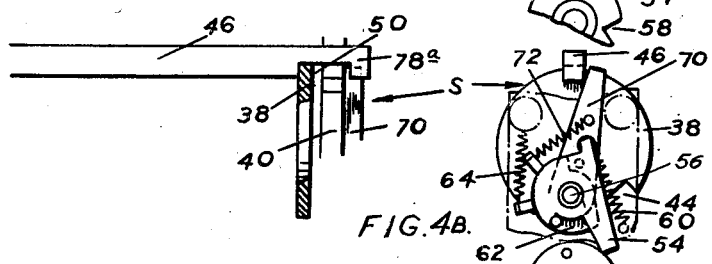

Fig. 4B shows the position of parts during delivery when the trigger 14 is released. The rod 46 is then moved to the right (Fig. 1) by the spring 52 until it abuts against the disc 38. It remains there ready to snap further to the right when the notch 44 of disc 38 comes opposite it.

Figure 4C:
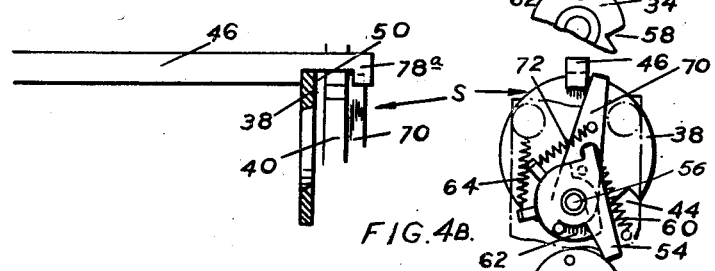

Fig. 4C shows the position of the parts when the notch 44 of disc 38 comes opposite the rod 46. The latter moves across and arrests further movement of the disc 38. At this time the trigger 14 moves into the unoperated position and allows the valve V to close. The flow through the meter stops and the valve closes. The movement of the rod 46 also brings the notch 50 opposite the lever 70 so that the latter snaps into the notch under the action of the spring 72. The movement of the lever 70 is limited by abutment of its stop 74 (Fig. 4C) against the shoulder 76 on the piece 62. The trigger 14 now cannot be depressed because the lever 70 holds the rod 46 against movement to the left (Fig. 1).

To free the rod for such movement the hour hand $h$ of the clock must be brought back to zero. This can be done only through the minute hand $m$ so that a new delivery can be initiated only when both hands have been re-set to zero.

The re-setting of the hands is effected through a knob 78 (Figs. 1 and 3) which is connected to the hub 79 of the minute hand $m$ through a ratchet 80. The ratchet 80 allows the minute hand $m$ and its arbor 28 to be turned, against the restraint of the clutch 29, only in reverse, i. e. in the present case, counterclockwise. The minute hand hub 79 is provided with a plunger 81 in a radial bore 82 (Fig. 6) which is pressed by a spring 83 against the peripheral surface of the sleeve 34 which forms the hub of the hour hand $h$. The sleeve 34 has a flat 84 formed on it which is bounded by a shoulder 85. Thus, the minute hand $m$ can be turned freely clockwise. However, on being turned counterclockwise, its plunger 81 comes up against the shoulder 85 and carries the sleeve 34 and the hour hand $h$ with it.

When the hands are reset to zero through the knob 78, the notch 58 is brought opposite the lever 54 which is snapped into the notch by the springs 60 and 64. This movement of the lever 54 is transmitted to the lever 70 through the shoulder 76 on the piece 62 and the pin 74 on the lever 70. The lever is thus brought back clear of the rod 46 in the position shown in Fig. 4.

In order that the parts may not be damaged by excessive pressure applied to the trigger 14 when the rod 46 is locked against movement, the trigger is hinged at 86 and is provided with a spring 87 which will resist normal pressure but yield to abnormal pressure.

The extent to which the valve V is opened by the trigger 14 is adjustable. For this purpose, the trigger 14 has pivotally mounted on it a lever 88 (Fig. 1) which can be set by means of an adjusting screw 89 at different distances from the stem 90 of the valve.

The valve body 91 (Fig. 1) is mounted to slide in a cylindrical chamber 92 which communicates with the delivery passage 124 from the meter through a hole 93 and seats against a narrow seating 94. The stem 90 of the valve is of triangular cross-section (Figs. 1 and 7) and passes through a cylindrical bore 95 in the valve body. It is urged forward by a spring 96 and its rearward movement is limited by a split pin 97.

When the trigger 14 is operated to initiate delivery, the stem 90 is pushed backwardly so that communication is established between the delivery passage 124 and the outlet from the unit through the spaces between the triangular stem 90 and its bore 95. The valve body is thus relieved to a substantial extent of the pressure exerted in the valve closing direction by the fluid. The pressure of the fluid acting on the narrow rim 98 can then move the valve body 91 off its seat 94. It is, of course, also moved positively by the trigger 14 through the adjustable lever 88.

When, during operation, the trigger 14 is released, the pressure of the liquid forces the stem 90 forward so that the bore 95 is closed. The valve body is then moved towards its seat 94 by the fluid pressure. The valve is, however, not entirely closed because the trigger 14 is held against movement back into the position shown in Fig. 1 by the abutment of the rod 46 against the disc 38. The unit, therefore, delivers at a reduced rate. When, on completion of the delivery of the next whole unit of volume, the rod 46 moves through the notch 44 in the disc 38, the valve closes completely.

If, after the trigger 14 has been released so that automatic stopping has been initiated to take place at the completion of delivery of the next unit, it is desired to increase the quantity to be delivered, this can be done simply by depressing the trigger 14 again. This must, however, be done before delivery has actually stopped because immediately upon stopping of delivery, the rod 46 becomes locked until the hands have been re-set.

It will be cear that there is no other way of stopping the delivery except by release of the trigger 14 and that the delivery cannot be stopped except upon completion of a whole number of complete units. The customer is therefore very well safeguarded against short delivery. The arrangement of the clock at the delivery end of the hose is a great convenience both to the customer and to the operator. The operator's task is also very simple. He does not have to exercise any great amount of care in choosing the moment at which he must release the trigger, and he does not have to pre-set the amount which is to be delivered. That amount can be increased during delivery if desired.

The valve 20 is shown on a larger scale in Figs. 8–10 in different positions.

Valve 20 has a barrel 21 in the bore of which is arranged a spider 99 which supports the stem 100 of a mushroom valve 101. The stem 100 carries a spring 102 which tends to hold the rear face of the valve 101 against an annular seat 103 formed by the end surface of the barrel. The front face of the head of the mushroom valve 101 is conical and bears against a similarly formed surface 104 on a movable seating member 105 in the form of a sleeve mounted to slide in the barrel 21. The sleeve 105 has a flange 106 at its rear end which is held against removal from the barrel by means of a cap nut 107. A spring 108 arranged round the sleeve between the flange 106 and the head of the cap nut 107 tends to hold the sleeve 105 against movement out of the barrel. The two springs 102 and 108 thus tend to hold the rear face of the valve 101 seated against the fixed seating 103 on the barrel 21 and the movable seat 105 against the front face of the valve 101.

In the inoperative position shown in Fig. 8, that is to say, when the nozzle is closed, the pressure of the liquid to be dispensed acts on the small area of the rear face of the valve 101 and does not act directly on the sleeve 105. When the liquid pressure is increased sufficiently to overcome the force of the two springs, the valve 101 moves forwardly away from the fixed seat 103 on the barrel and carries the sleeve 105 forwardly with it as shown in Fig. 9. The sleeve 105 is thereby exposed to the direct pressure of the liquid and is pushed ahead of the valve 101 so that a delivery outlet 109 is provided for the liquid as shown in Fig. 10. When the fluid pressure decreases, the sleeve 105 is reseated against the head of the mushroom valve 101 as shown in Fig. 9 and the valve is reseated against the barrel. The sleeve 105 is thus relieved of the direct pressure of the liquid and the parts resume the positions shown in Fig. 8.

In the most retracted position of the sleeve 105, i. e. when the nozzle is closed (Fig. 8), the forward end of the sleeve projects beyond the forward end of the cap nut 107. Also, the conical front face of the valve 101 projects through the opening in the front end of the sleeve 105. The thickness of metal at 105a immediately surrounding that opening is very small. There are, therefore, no cavities, recesses or chambers having access to the outside in which the liquid can collect and from which liquid can drip.

Also, the only external surface of the valve which is "wetted" is that part of the conical surface of its head which projects through the opening in the sleeve 105. This surface is quite small and generally gives rise to the formation of only a single drip, even with the most viscous liquids. Indeed, the only other external surface which is wetted is that of the opening in the sleeve through which the valve head projects. This surface is so small as to be negligible.

It will be appreciated that the form of construction described above gives an annular, converging stream of the liquid being dispensed. A very satisfactory, stream-lined flow is thus obtained. This, and the non-dripping feature of the nozzle provide a solution of the problem of dispensing cleanly, viscous liquids such as lubricating oil.

The unit described above can be made to operate with any liquid. Its size will, of course, depend upon the quantities which are likely to be dispensed at one operation. Thus a bigger unit would be provided for petrol which is normally supplied in half pints. The unit can be made of very small overall dimensions and weight. A unit suitable for dispensing lubricating oil to motorists can be made of a weight of about 5½ lbs.

I claim:

1. A portable delivery unit for attachment to the delivery end of a hose, comprising a liquid meter; a volumetric delivery indicator operated by the meter; manually operable means for initiating delivery; means for automatically stopping the delivery when a desired unitary quantity of liquid has been delivered; the means for initiating delivery comprising a hand-operated trigger controlling a valve on the delivery side of the meter; and the delivery indicator comprising a dial having two hands, including a first hand, which are driven by the meter over the dial in which means controlled by the means driving the first hand are provided which, when the trigger has been operated to initiate delivery, preclude the return of the trigger into the delivery stopping position except when the first hand is in a particular angular position; said latter means comprising a notched disc, and the trigger being spring-loaded so as to be biased towards the delivery stopping position and being connected to a part which, when the trigger is released by the operator, is pressed by the trigger spring against the face of the notched disc, whereby the trigger will be held against movement into the delivery stopping position except when the notch comes opposite the said part.

2. A portable delivery unit for attachment to the delivery end of a hose, comprising a liquid meter; a volumetric delivery indicator operated by the meter; manually operable means for initiating delivery; and means for automatically stopping the delivery when a desired unitary quantity of liquid has been delivered; the means for initiating delivery comprising a hand-operated trigger controlling a valve on the delivery side of the meter; and the delivery indicator comprising a dial having two hands including a first hand which are driven by the meter over the dial and in which means controlled by the mechanism driving the first hand are provided which, when the trigger has been operated to initiate delivery, preclude the return of the trigger into the delivery stopping position except when the first hand is in a particular angular position; said latter means comprising a notched disc, and the trigger being spring-loaded so as to be biased towards the delivery stopping position and being connected to a part which, when the trigger is released by the operator, is pressed by the trigger spring against the face of the notched disc, whereby the trigger will be held by the notched disc in a position in which the valve is partially closed.

3. A portable delivery unit for attachment to the delivery end of a hose, comprising a liquid meter; a volumetric delivery indicator operated by the meter; manually operable means for initiating delivery; and means for automatically stopping the delivery when a desired unitary quantity of liquid has been delivered; said means for initiating delivery comprising a hand-operated trigger controlling a valve on the delivery side of the meter; and the delivery indicator comprising a dial having two hands including a first hand which are driven by the meter over the dial and in which means controlled by the mechanism driving the first hand are provided which, when the trigger has been operated to initiate delivery, preclude the return of the trigger into the delivery stopping position except when the first hand is in a particular angular position, whereby the trigger serves both to initiate delivery and also to initiate stopping of the delivery.

HARRY GODFREY SOAR.

References Cited in the file of this patent

UNITED STATES PATENTS

| Number | Name | Date |
| --- | --- | --- |
| 1,697,840 | Hayes | Jan. 1, 1929 |
| 1,754,589 | Wydler | Apr. 15, 1930 |
| 2,058,138 | De Lancey | Oct. 20, 1936 |
| 2,089,724 | Wydler | Aug. 10, 1937 |
| 2,109,084 | Carroll | Feb. 22, 1938 |
| 2,224,540 | Fraser | Dec. 10, 1940 |
| 2,460,275 | Bergman | Feb. 1, 1949 |